United States Patent [19]
Vietrogoski et al.

[11] Patent Number: 4,833,959
[45] Date of Patent: May 30, 1989

[54] APPARATUS AND METHOD FOR MAKING BREAD CRUMBS

[75] Inventors: Charles J. Vietrogoski; Guy C. Coker; Richard Obarowski, all of Dover, Del.

[73] Assignee: General Foods Corporation, White Plains, N.Y.

[21] Appl. No.: 941,449

[22] Filed: Dec. 15, 1986

[51] Int. Cl.⁴ .................................................. B26D 3/22
[52] U.S. Cl. ...................................... 83/404.2; 83/340; 83/342; 83/355; 83/98
[58] Field of Search .................... 83/340, 404.1, 404.2, 83/342, 355, 98

[56] References Cited
U.S. PATENT DOCUMENTS

| 1,973,526 | 9/1934 | Diamond et al. | 83/340 X |
| 2,107,002 | 2/1938 | Jensen et al. | 83/92 |
| 2,118,531 | 5/1938 | Van Veen | 83/340 X |
| 3,777,600 | 12/1973 | Long et al. | 83/340 X |
| 4,405,126 | 9/1983 | Frye et al. | 83/98 X |
| 4,410,315 | 10/1983 | Frye | 83/98 X |
| 4,709,608 | 12/1987 | Vietrogoski et al. | 83/355 |

Primary Examiner—Donald R. Schran
Attorney, Agent, or Firm—Sam D. Walker; Thomas R. Savoie; Daniel J. Donovan

[57] ABSTRACT

A method and apparatus for producing homogeneous bread crumbs including a conveyor for conveying bread loaves that securely holds the bread loaves while they are sliced by a rotary involute knife slicer into slices of substantially uniform thickness, a dicer that dices the slices into homogeneous bread crumbs and a chute with a deflector and a compressed air source which conveys the bread slices from the rotary involute slicer to the dicer and aligns and spaces the slices for input to the dicer.

2 Claims, 3 Drawing Sheets

APPARATUS AND METHOD FOR MAKING BREAD CRUMBS

FIELD OF INVENTION

The present invention relates to an apparatus and a method for continuous production of homogeneous bread crumbs.

BACKGROUND OF THE INVENTION

The growing popularity of pre-mixed stuffing mixes and other similar products has created a demand for large quantities of bread crumbs. By "bread crumbs" is meant: The bread crumbs used in such products must be substantially uniform in size to produce an acceptable product because consistent volumes of crumbs must be incorporated into each mix. Past crumbs had to be screened to separate random sizes of crumbs. Therefore, there is a need for a method and apparatus for making large quantities of bread crumbs of substantially uniform size. Ideally, these bread crumbs are produced from ordinary bread loaves thereby eliminating the need for extrusion apparatus or special baking apparatus for making special loaves suitable for making the crumbs.

Bread crumbs can be made by slicing the bread and then dicing the bread slices. Many types of bread slicers are available, but bread is normally sliced on band-saw slicers. Band-saw slicers use one or more blades that are placed in a set of guides that determine the width of each slice. Band-saw slicers can slice at rates of 100–2000 loaves per hour depending upon the manufacturer, model and application. These band-saw slicers slice the entire loaf at a time. This type of slicer is limited to slice thicknesses of 5/16" or greater.

Dicing machines are available from various manufacturers in designs including continuous rotary cutting blades and reciprocating cutting blades. Either kind may be used to dice sliced bread. The dicer is only capable of handling a single slice at a time.

Conventional band-saw slicers would not be particularly useful (for several reasons). The dicer handles a single slice at a time. The slices produced by a band-saw slicer would have to be separted by mechanical means such as walking beam conveyors or belt conveyors. This additional apparatus for sorting the slices is costly. Also, several dicers would be needed to keep the process running smoothly and avoid a pileup of slices between the slicer and dicer. Another problem with the band-saw slicer is that it is generally incapable of slicing sufficiently thinly, such as ¼" slices which are the most desirable size for bread crumbs.

It is an object of the present invention to provide an economical method and apparatus for continuously producing large quantities of homogeneous bread crumbs. It is a further object of the invention to provide such method and apparatus while avoiding the problems described above in connection with the use of a band-saw slicer.

These and other objects of the present invention will be apparent from the summary and detailed description which follow.

SUMMARY OF THE INVENTION

The present invention relates to an apparatus for production of bread crumbs from loaves of bread comprising:

a continuous rotating involute knife slicer for slicing loaves of bread into slices of substantially equal width, a conveyor for conveying loaves of bread to said slicer, said conveyor including means for holding loaves of bread while the loaves are sliced;

a dicer for dicing individual bread slices into substantially homogeneous bread crumbs, and a means for sequentially conveying the bread slices individually from the slicer to the dicer.

In another embodiment, the present invention relates to a method for continuous production of substantially homogeneous bread crumbs from loaves of bread comprising the steps of:

conveying loaves of bread to a continuous rotating involute knife slicer, slicing the loaves of bread while the loaves are securely held in place to produce bread slices of substantially uniform thickness, conveying the sliced bread from said slicer to a dicer a single slice at a time, and dicing the bread slices into substantially homogeneous bread crumbs.

DETAILED DESCRIPTION OF THE PREFERRED EMBODIMENT

Figure 1:
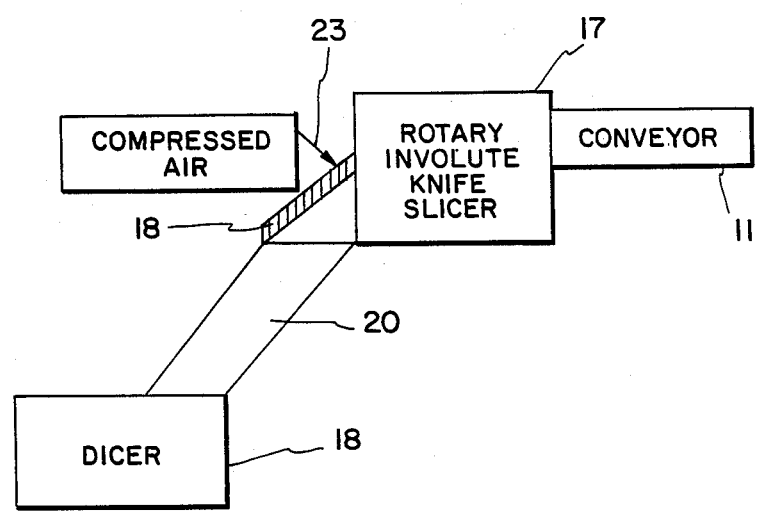
FIG. 1 is a block diagram of the apparatus of the present invention.
Figure 2:
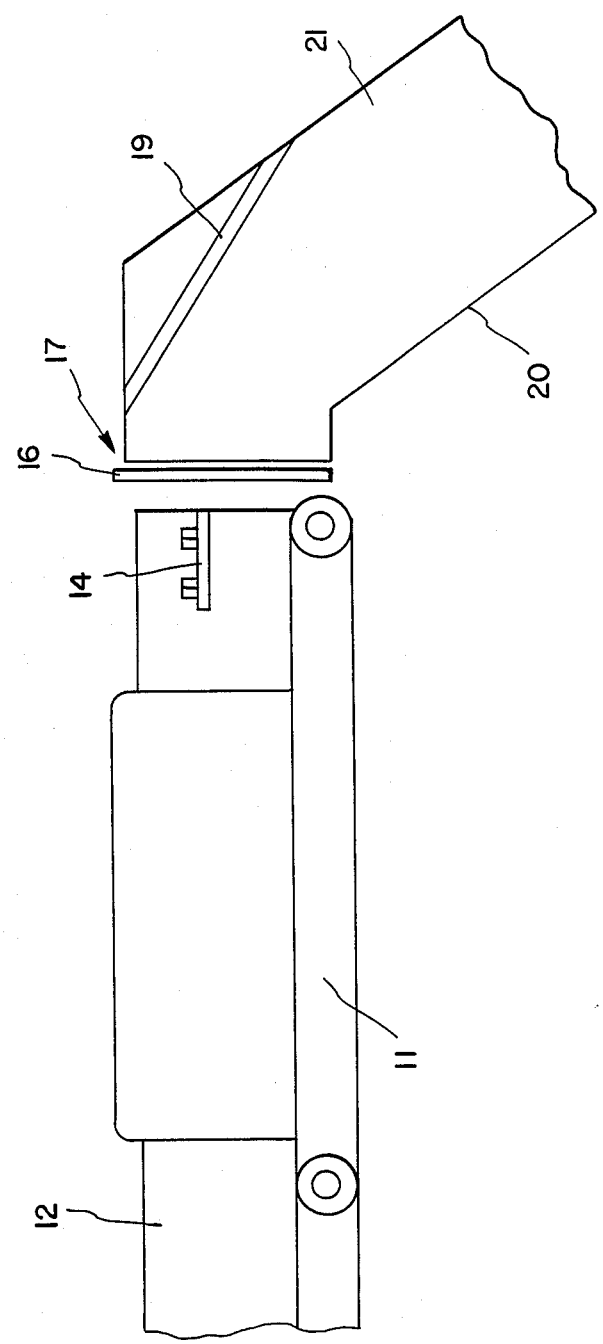
FIG. 2 is a diagrammatic side elevation view of apparatus according to the invention.
Figure 3:
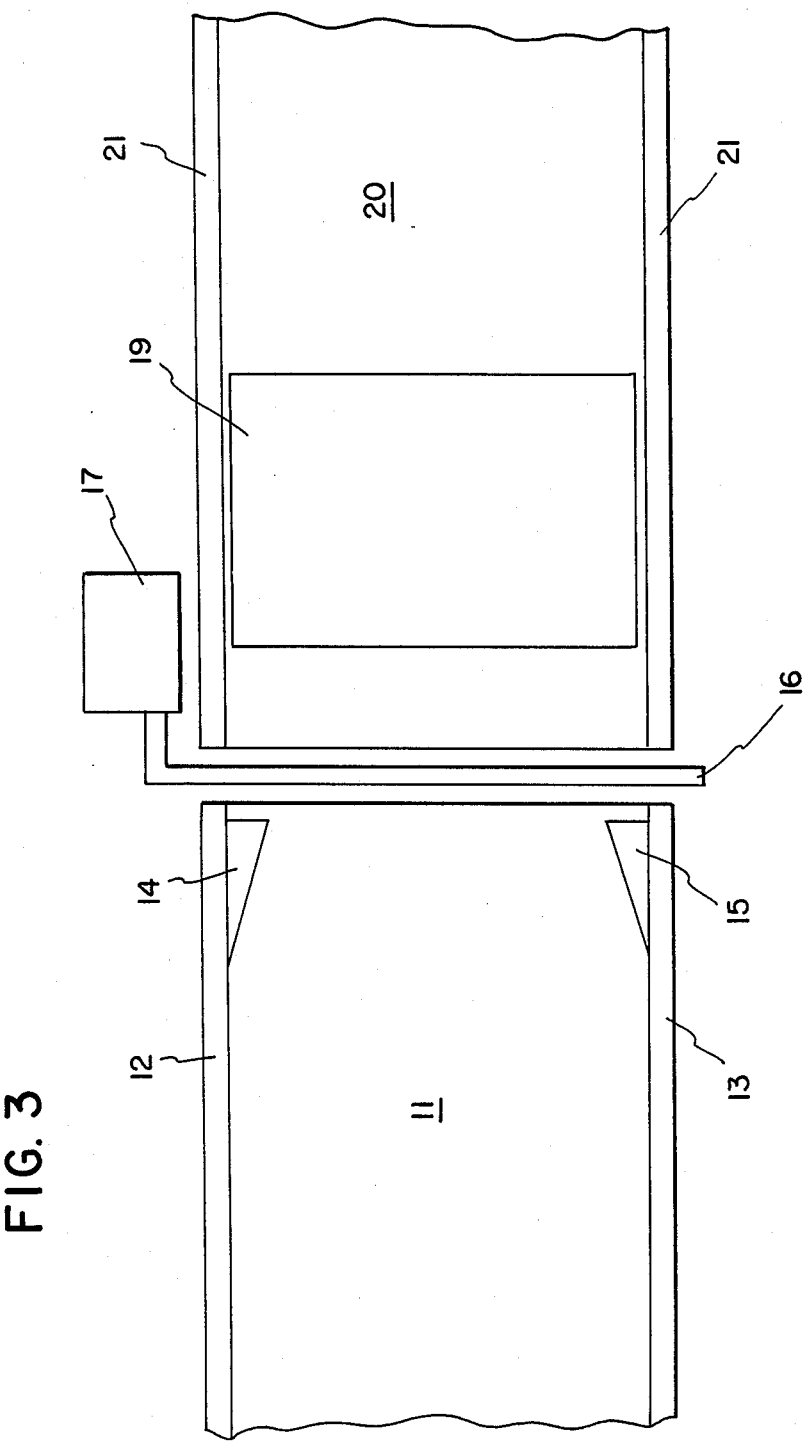
FIG. 3 is a diagrammatic top plan view of apparatus according to the invention.

Referring to FIG. 1, the apparatus of the present invention employs a standard conveyor 11 such a belt conveyor. In a preferred embodiment, the conveyor is modified in two significant respects. First, it is provided with a pair of guide rails, one on either side of the conveyor. These guide rails 12, 13 prevent lateral movement of bread loaves on the conveyor and thereby insure that the bread loaves arrive at the slicer along the appropriate path. Second, each of these guide rails is equipped with an adjustable side knife 14, 15 such as those described in copending application Ser. No. 862,883, filed on May 13, 1986. The side knives are located approximately ⅛ inch from the slicer blade 16. The guide walls and side knives securely hold the bread loaves while they are sliced to ensure production of slicers of substantially uniform thickness. These knives are particularly useful when slicing the butt end of the loaf since without the knives the butt end tends to fall through the slicer without being sliced.

In the preferred embodiment, the slicer 17 is elevated above the slicer 18 to alow gravity feed of the sliced bread from the slicer 17 to the dicer 18. To accommodate this arrangement, it is preferred that the conveyor is lengthened and inclined so that an operator can stand at the level of the dicer in position to control operation of the dicer while also being above to control feeding of the bread loaves onto the conveyor.

The slicer selected for the present invention is a continuous rotating involute knife slicer. These slicers are known per se. Suitable examples are described in U.S. Pats. Nos. 2,903,032, 2,696,099 and 3,027,924. However, in order to employ this type of slicer to produce bread slices of uniform thickness, it is preferred to incorporate the guide rails and side knives described in copending application Ser. No. 862,883, filed on May 13, 1986.

A continuous rotating involute knife slicer is useful in the present invention for several reasons. It allows the loaves of bread to be cut into thin slices such as preferred ¼ inch thick slices. This is important because this size is preferred for the production of bread crumbs. Another important feature is the speed of this slicer. A rotating slicer blade will rotate at approximately 500 revolutions per minute. This translates into the slicing of over 800 nine inch loaves of bread into ¼ inch thick slices per hour.

Most important, though, is the single slice output of the rotating involute knife slicer. This single slice output allows the entire system to be operated with only a single dicer. Moreover, there is no need for sorting or spacing of the slices by a complex conveying apparatus in order to feed them to the dicer. The output from the rotating slicer can be fed directly to the dicer by gravity feed and all that is required is to align the slices properly for the dicer. Another feature that makes the continuous rotating involute knife slicer attractive is the ability to adjust slice thickness simply by varying the speed of the input conveyor.

When the bread slices leave the rotary involute knife slicer they are deflected by a deflector 19 into a chute 20. The chute 20 conveys the bread slices by gravity feed to a conventional dicer. The deflector 19 insures that bread slices enter chute 20 flat with the bottom end first and also causes the bread slices to proceed down the chute in single file while minimizing the velocity loss of each slice. The preferred deflector 19 is a piece of stainless steel 5 inches wide, 8 inches long and 1/16 inch thick. It is preferably built into the top of the chute 20.

The chute 20 conveys the bread to the dicer and aligns the bread slices for the dicer. This is preferably accomplished by mechanically manipulating the bread slices into the proper position as they fall down the chute 11. The contour of the walls 20, 21 of the chute 20 will accomplish the alignment.

Another feature that is included in the preferred embodiment is an air line 23 which is placed in an opening near the top of the chute 11. Low pressure compressed air is blown through this air line and is directed at the flying bread slices as they are dropped from the slicer. The air stream changes the flow pattern of the slices. In this manner the overall flow pattern of the bread slices down the chute can be manipulated to conform with the input requirements of the dicer. This feature will prevent jamming of the dicer caused by two or more bread slices arriving simultaneously. It will also allow the dicer enough time to dice a slice before the next slice arrives.

The dicer employed by the present invention is a standard preferably commercially available dicer. Either continuous rotary dicers or reciprocating dicers can be used in the present invention. Preferably a dicer having the capability of dicing at least 30,000 slices per hour will be selected. This will accommodate a rotating involute slicer operation at 500 r.p.m. In addition, the dicer should be able to handle bread slices of up to ⅜ inch thick. In a preferred embodiment the dicer is set up to produce bread crumbs ¼" x ¼" x ¼". However, the bread crumbs may range in size from ⅜"×⅜"×⅜" to 3/16"×3/16"×3/16".

The apparatus and method of this invention produce a larger amount of usable bread crumbs than current methods. Moreover, the cost of producing bread crumbs is lower when produced by the present invention.

To operate the apparatus, the feed rate to the slicer is set by setting the speed of the input coveyor. The speed of the input conveyor is also correlated with the speed of rotation of the knife blade since these factors will determine the slice thickness. Once the speed of the knife blade and input conveyors are set to provide the desired throughput rate and slice thickness, the dicer is set to accommodate the throughput rate. At this point the input conveyor, slicer, dicer and air line are all activated and an operator begins manually placing loaves of bread on the input conveyor. The bread loaves will proceed through the slicer and be sliced into slices of uniform thickness, deflect into the chute 20, be adjusted and aligned by the compressed air and by the fall through chute 20, fall into the dicer and be diced into homogenous bread crumbs.

It will be apparent to one of ordinary skill in the art that many modifications and variations of the present invention are possible in light of the above description. It is therefore to be understood that the scope of the invention is to be defined by the claims appended hereto.

What is claimed is:

1. Apparatus for the production of bread crumbs from loaves of bread wherein a slicer is located in an elevated position in relation to a dicer comprising:
   a continuous rotating involute knife slicer for slicing loaves of bread into slices of substantially equal width;
   a conveyor for conveying loaves of bread to said slicer, said conveyor including guide rails along said conveyor which guide the loaves of bread to the slicer in a single file
   a pair of side knives attached to said guide rails for securely holding the loaves of bread to prevent uneven slicing of the loaves;
   a chute which sequentially receives bread slices individually from said slicer and conveys them to the dicer by gravity feed;
   a deflector at the top of said chute for deflecting said individual bread slices into said chute as the slices come out of said slicer; and
   said dicer for dicing individual bread slices into substantially homogenous bread crumbs.

2. An apparatus as claimed in claim 1 wherein said means for conveying the bread slices from the slicer to the dicer further comprising:
   means for applying low pressure, compressed air to the bread slices as the slices leave the slicer, to direct the bread slices down said chute in single file and to control the flow pattern of the bread slices from said slicer to said dicer.

* * * * *